Figure 1:
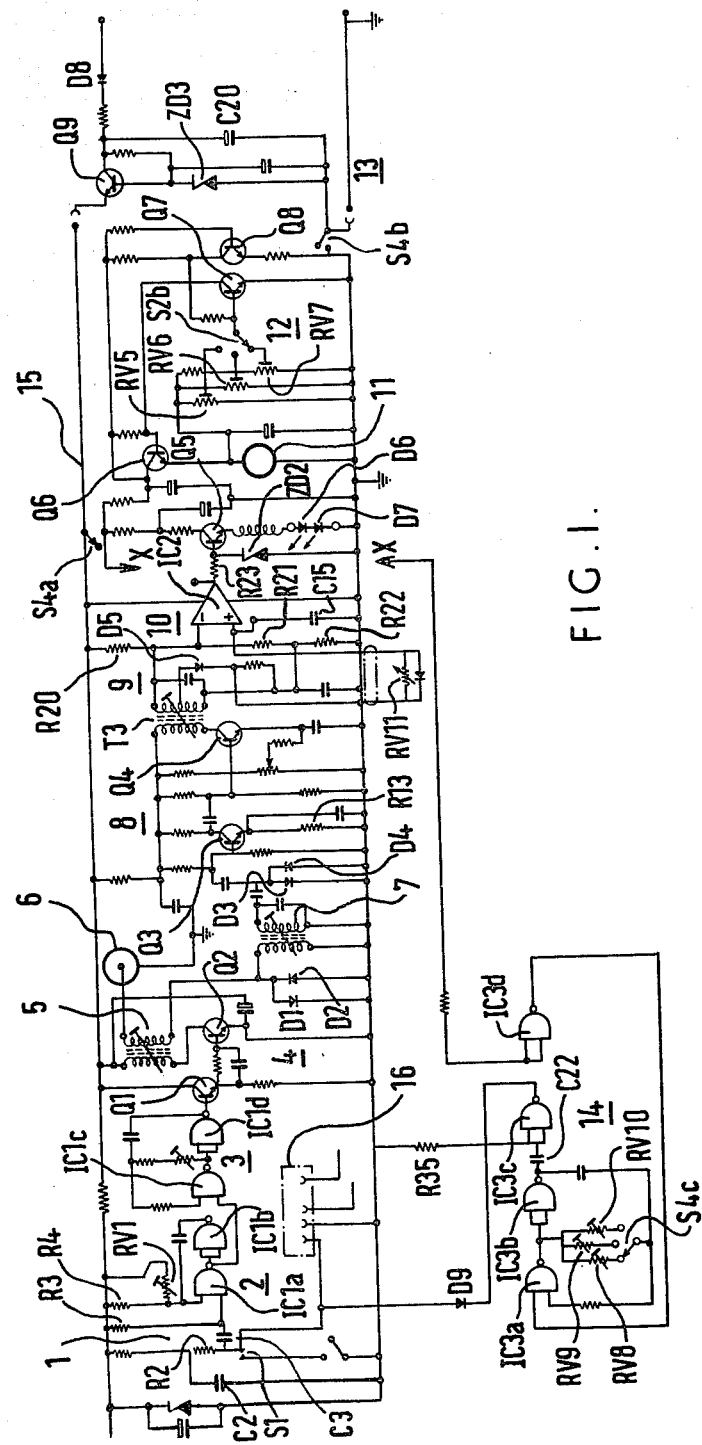

United States Patent [19]
Toubkin et al.

[11] 4,210,970
[45] Jul. 1, 1980

[54] ECHO SOUNDERS

[75] Inventors: Walter M. Toubkin, London; Alan J. Mulley, Stevenage, both of England

[73] Assignee: Space Age Electronics Limited, London, England

[21] Appl. No.: 860,896

[22] Filed: Dec. 15, 1977

[30] Foreign Application Priority Data
Dec. 16, 1976 [GB] United Kingdom ............... 52615/76

[51] Int. Cl.² .......................... G01S 9/68; G01S 7/66
[52] U.S. Cl. ..................................... 367/109; 367/13; 367/114; 367/901
[58] Field of Search ............... 340/3 C, 1 C, 3 R, 1 R

[56] References Cited
U.S. PATENT DOCUMENTS

| | | | |
|---|---|---|---|
| 2,599,586 | 6/1952 | Ross | 340/1 R |
| 3,123,797 | 3/1964 | Ehrman | 340/1 R |
| 3,373,399 | 3/1968 | Dorr et al. | 340/1 C X |
| 3,427,866 | 2/1969 | Weighart | 340/1 R |
| 3,495,208 | 2/1970 | Grada | 340/3 C X |
| 3,624,596 | 11/1971 | Dickenson et al. | 340/3 R |
| 3,747,053 | 7/1973 | Austin | 340/3 R |

FOREIGN PATENT DOCUMENTS

| | | | |
|---|---|---|---|
| 470826 | 5/1974 | Australia | 340/3 C |
| 2504200 | 8/1976 | Fed. Rep. of Germany | 340/3 C |

*Primary Examiner*—Richard A. Farley
*Attorney, Agent, or Firm*—Fleit & Jacobson

[57] ABSTRACT

An echo sounder has a transducer for transmitting and receiving pulses of energy, a rotary arm display and a meter or digital display. The rotary arm is arranged to cause the transducer to transmit a pulse of energy on each occasion it passes a datum position. The motor of the rotary arm display may be switched off while simultaneously energizing an oscillator having an output frequency equal to that of the rotational speed of the motor prior to deenergization.

10 Claims, 5 Drawing Figures

ECHO SOUNDERS

This invention relates to echo sounders.

It has been known for many years to use an echo sounder in marine applications usually either for fish detection of for depth sounding. The sounders are also used in various industrial applications for example to detect the depth of granular material in a bunker.

It is known to use in a marine echo sounder, a rotary arm which carries a light emitting device connected to the output of the transducer which transmits sonar pulses and which receives sonar echo pulses so that the light emitting device emits light on transmission of a sonar pulse and then on receipt of a sonar echo pulse. In such an echo sounder it is usual to arrange a scale around the rotary arm and as the rotary arm passes the "12 o'clock" position a pulse of sonar energy is transmitted. This type of echo sounder has found wide application but has a number of problems. Firstly, the motor which drives the rotary arm drains a considerable amount of current and this is undesirable in the battery energised echo sounder. Secondly, the motor is subject to wear and thirdly the motor speed tends to vary with time due to friction, variations of mechanical loading, varying performances of the brushes and lubricants, different temperature and ageing of other parts of the motor. Variation in motor speed causes a substantial error in depth readings as these are based on the assumption that the motor speed is constant for any given setting. A further disadvantage is that there are practical limits to the maximum and minimum motor speeds which can be used and consequently there are practical limits to the maximum and minimum scale ranges.

It is known to provide an echo sounder having a meter or digital display, which is used as a remote repeater for the rotary arm display described above. In this case a signal is generated representative of the time between the transmission of a sonar pulse and the receipt of a sonar pulse echo. The display is fairly easy to read but this arrangement has certain disadvantages. Firstly, all the problems of the rotary arm type echo sounder remain and further there are often a large number of echoes, for example, from turbulance, fish and the sea bed. When these appear as flashes of light on the rotary arm display it is quite easy to distinguish the sea bed echo but the meter may respond alternatively to the sea bed and the fish echo signals so that the meter pointer moves rapidly between two or more positions and is very difficult to read.

Rotary arm type echo sounders are also used in industrial applications and in such applications have all the disadvantages resulting from the use of the motor referred to above.

It is an object of this invention to provide an echo sounder for marine or other applications in which at least one of the stated problems is at least alleviated.

According to this invention there is provided an echo sounder comprising transducer means for transmitting and receiving pulses of energy, and first and second display means for displaying received echo pulses in a manner indicative of the distance of the object giving rise to the echo, the first display means being renderable inoperative while leaving the second display means operative.

In a preferred embodiment, the first display means is a rotary arm display comprising a motor, a rotary arm coupled to the motor, a light emitting device carried by the rotary arm, a scale with which the rotary arm co-operates, and switch means co-operating with the rotary arm and coupled to the transducer means, and the second display means includes an oscillator coupled to the transducer means and connected so as to be rendered operative when the first display means is rendered inoperative, said first display means being rendered inoperative by deenergisation of the supply to the motor.

The described preferred embodiment of this invention is applicable for use on a boat as a depth sounder in which case the rotary arm display is initially rendered operative and adjusted so that echoes from objects other than the sea bed do not have sufficient strength to render the light emitting device luminous. It is then known that the received echo signals passed to the second display means are such that they must come from the sea bed and the display given by the second display means will be very stable.

Preferably the echo sounder comprises a circuit for generating a voltage representative of the period between a transmitted pulse and a received pulse and a meter or a digital display for displaying the output of the circuit.

Suitably, the circuit comprises a bistable and an integrator for integrating the output of the bistable which is arranged to be set by each transmitted pulse and reset by received pulses.

The echo sounder may comprise a variable width monostable which receives transmitted pulses, the trailing edge of each output pulse of the monostable being arranged to set the bistable, and a gate through which received pulses are applied to the reset input of the bistable, said gate being connected to the output of the monostable and arranged to pass received pulses other than during output pulses of the monostable.

The width of the monostable is set in accordance with the depth between the transducer means and the keel.

Alternatively, the circuit comprises a constant current generator, a capacitor connected to be charged by said constant current generator, a capacitor discharge circuit connected across the capacitor and arranged to be rendered operative by each transmitted pulse, and a sample and hold circuit connected to the capacitor and arranged to be rendered operative by each received pulse.

Where the first display means is of the rotary arm type it is desirable that there is a motor speed control circuit. This is because the accuracy of the measurements are dependent on the constancy of the voltage supply to the motor and also because there are variations in motor speed due to mechanical loading, varying performances of the brushes and lubricants, different temperature and ageing of other parts of the motor.

The motor speed control circuit may comprise a pick-up for co-operating with the motor to produce a train of pulses at a rate proportional to the motor speed, a pulse shaper connected to the output of the pick-up and arranged to produce an output pulse of constant width for each input pulse to the pick-up, and an integrator connected to the output of the pulse shaper and arranged to integrate a potential other than during the output pulses of the pulse shaper, the output of the integrator being connected as the supply voltage of the motor.

This motor speed control circuit has the advantage that it can be set to operate the motor at a very slow speed.

Preferably the echo sounders includes a pulse width discrimination circuit through which the output of the transducer means is coupled to the first and second display means, said discrimination circuit being arranged to suppress pulses having a width less than a predetermined minimum.

The type of interference intended to be suppressed by the pulse width discrimination circuit is that produced by i.c. engines, for example, outboard engines occurring on boats.

Figure 2:
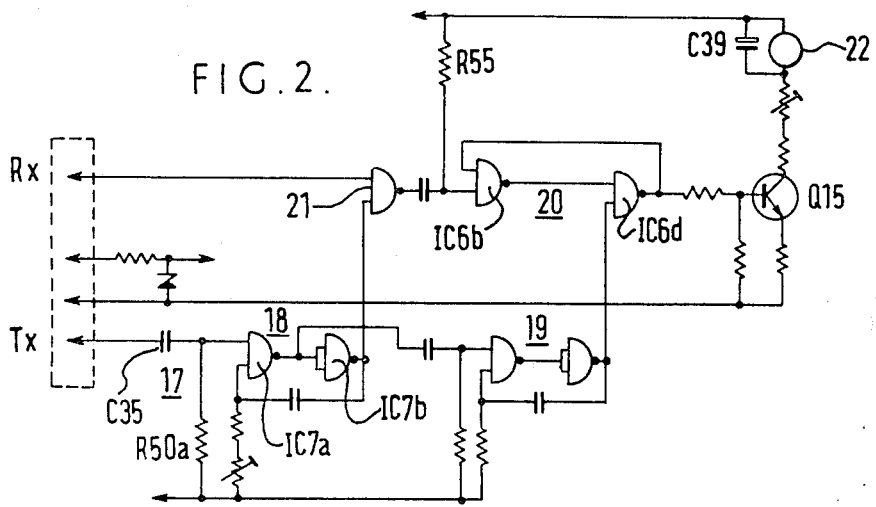
Figure 3:
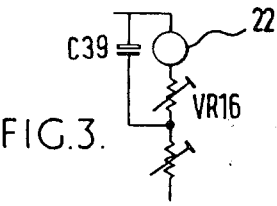
Figure 4:
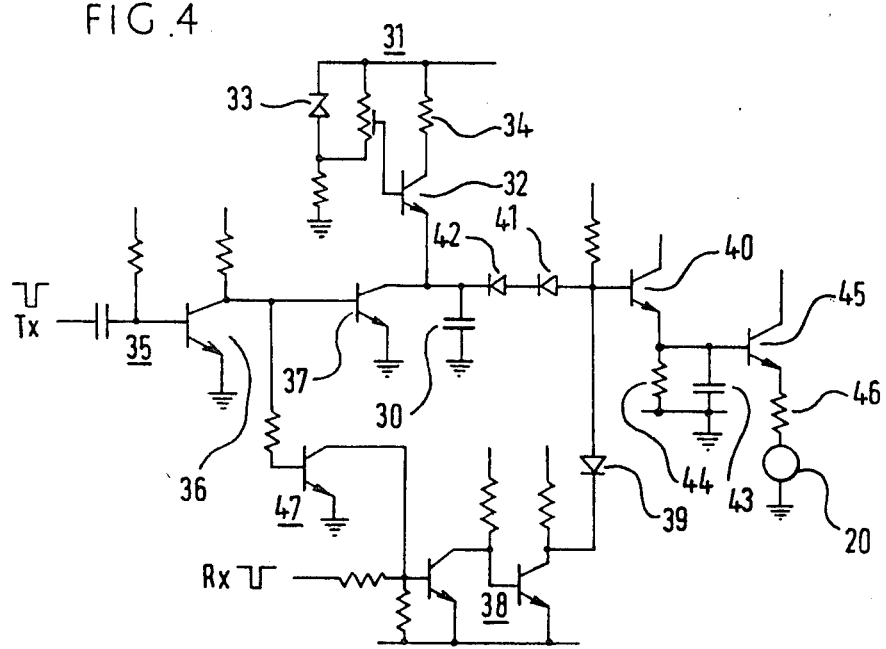
Figure 5:
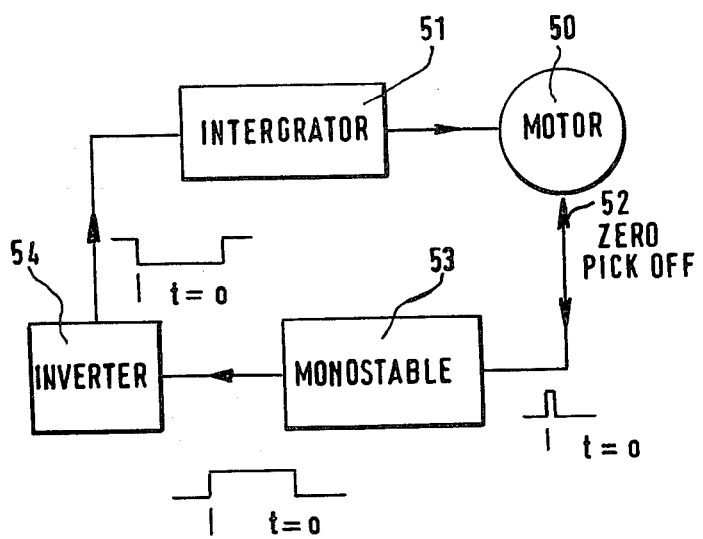

Echo sounders in accordance with this invention will now be described, by way of example only, with reference to the accompanying drawings, of which:

FIG. 1 and FIG. 2 together are a circuit diagram of an echo sounder in accordance with this invention;

FIG. 3 is a circuit diagram illustrating a modification of the part of the echo sounder shown in FIG. 2; and FIG. 4 is a circuit diagram of a further modification of the part of the echo sounder shown in FIG. 2 and to the drawing accompanying the Provisional Specification of the part of the echo sounder shown in FIG. 2; and FIG. 5 is a circuit diagram of a modification of part of the echo sounder shown in FIG. 1.

The echo sounder of FIGS. 1 and 2 employs a conventional rotary arm carrying light emitting diodes at one end and mounted on a shaft of an electric motor; the diodes rotate around a scale calibrated in units of depth. A magnet is mounted on the other end of the rotary arm and passes a reed relay in a datum position of the rotary arm in relation to the scale whereupon a transducer coupled to the reed relay is caused to emit a sonar signal. Echo signals received by the transducer are applied to the light emitting diodes which thereupon flash adjacent to the scale, the position of the light flash adjacent to the scale giving an indication of depth. The diodes also flash in response to the transmitted pulses.

A meter repeater is connected to receive a signal representative of the elapsed time between the transmission of the sonar pulse and the receipt of an echo signal and may be disposed in a location remote from the rotary arm to give a display of the depth from the object giving rise to the echo signal; that object may of course be the sea bed.

In detail, referring to FIG. 1, the reed relay is designated by S1 and on closure of the reed relay S1 because the magnet passes it, the voltage at the junction of the resistor R2 and the reed relay S1 falls thereby producing a negative going pulse. This negative going pulse is differentiated by differentiating circuit 1 and applied to a monostable 2 to produce a pulse output of defined length. The monostable 2 has its output applied to an oscillator 3 which produces an output signal at the frequency of 150 kHz which output has an envelope defined by the output pulse of the monostable 2 and is applied through a driver circuit 4 and an output transformer 5 to a transducer 6. Echo signals received by the transducer 6 are applied to the primary winding of an input transformer 7 which is in series with the secondary winding of the transformer 5. The output of the transformer 7 is applied to a two stage amplifier 8 having a variable gain to a detector circuit 9. It should be appreciated that the received echo pulse is at the frequency produced by the oscillator 3 and has an envelope which is detected by the detector 9. The output of the detector 9 is applied to a pulse width discriminator circuit 10, the function of which is to suppress pulses having a pulse width less than a minimum; the output of the discriminator circuit 10 is applied to the light emitting diodes D6 and D7.

The motor is denoted at 11 and its speed is controlled by a speed control circuit 12 which is energised from the supply through a voltage regulator 13.

A repeater meter is connected to the output of the pulse width discrimination circuit 10 in a manner which will be described later with reference to FIG. 2.

An oscillator 14 is provided but can be inhibited and on the assumption that the oscillator 14 is inhibited the operation of the echo sounder is the conventional operation namely that on each occasion the reed relay S1 closes, the transducer 6 transmits a sonar pulse, received echo pulses being applied through the transformer 7, the amplifier 8, the detector 9 and the pulse width discrimination circuit 10 to the diodes D6 and D7 which flash so that the depth can be read from the scale and the rotor arm. Simultaneously, the repeater meter has a deflection corresponding to the depth of the echo giving rise to the pulse.

It will be appreciated that repeater meters are very often unstable because there are various echoes received by the transducer such as from fish, air bubbles, and the sea bed. Assuming it is the sea bed echo which is desired the amplifier gain is reduced until only the sea bed echo is visible on the rotary arm display and then the motor is de-energised by operation of switches which will be described later and simultaneously the oscillator 14 is energised. The oscillator applies pulses to the monostable 2, the frequency of the oscillator 14 being designed to correspond to the frequency of operation of the reed relay S1. Thereafter the only display which will be available will be the repeater display which will not flicker because there is only one echo signal to which it will respond.

In more detail, when the reed relay S1 is closed the voltage at its junction with the resistor R2 falls to produce a negative going pulse which is differentiated by differentiator 1 consisting of the capacitor C3 and the resistor R3. This produces a sharp negative going spike at the input of the gate IC1a of the monostable 2. The monostable formed of the gate IC1a and the gate IC1b thereupon triggers producing an output pulse applied to the gate IC1c of the oscillator 3 which also includes gate IC1d; the oscillator 3 is an astable multivibrator.

The motor 11 has three possible speeds as will be described later and consequently the scale has three ranges marked on it. At the highest speed a resistor RV1 is connected in series with resistor R4 connected to the other input of the gate IC1a in order to shorten the pulse length.

The output of the oscillator 3 drives the driver circuit 4 having transistors Q1 and Q2, transistor Q2 being connected in series with the primary winding of the transformer 5.

Diodes D1 and D2 are connected across the primary of the transformer 7 and diodes D3 and D4 are connected across the secondary of the transformer 7 in order to clip the input from the transmitted pulse to the amplifier 8. The first stage of the amplifier 8 includes a resistance coupled transistor Q3; the second stage of the amplifier 8 includes a transistor Q4 whose output is applied through a transformer T3 to the tuned detector circuit 9 which includes detector diode D5. The pulse width discrimination circuit 10 includes an operational amplifier IC2 which is operated in open loop and therefore functions as a comparator. The output of the detector circuit 9 appearing at the cathode of the diode D5 is connected through a variable resistor RV11 to charge up a capacitor C15 connected between one input of the comparator IC2 and earth. The other input of the capacitor IC2 receives a reference potential from a voltage divider constituted by resistors R20, R21 and R22. In the absence of an output from diode D5 the input to the comparator IC2 from the voltage divider keeps it in the condition that its output remains at about 2 volts above earth. When a pulse appears on the output of the detector D5 it is integrated by the capacitor C15 and provided the pulses are of sufficient duration the output of the comparator IC2 will rise to within a volt of the rail volts which is approximately 9 volts. It will be seen that the function of the discrimination circuit 10 is to suppress voltage spikes having a very narrow width and therefore the discrimination circuit ensures that the echo sounder will not respond to spurious echoes of very short length. Variable resistor RV11 effectively controls the time constant of the discrimination circuit and it should be appreciated that the purpose of the discrimination circuit is to eliminate ignition interference which can well occur on small boats.

The output of the comparator IC2 is applied to the base of a transistor Q5, which acts as an emitter follower through a resistor R2, the light emitting diodes D6 and D7 are part of the emitter load of the transistor Q5. Additionally, the base of the transistor Q5 is connected to earth through a zener diode D2, the function of resistor R23 and zener diode ZD2 being clamped to the base of the transistor Q5 to 7½ volts thereby limiting the maximum current through the light emitting diodes D6 and D7.

The motor speed control circuit 12 is designed to provide three motor speeds and in detail a proportion of the voltage occurring across the motor 11 is selected by means of the switch S2b which selects one of the three preset variable resistors RV5, RV6 and RV7. The selected voltage is applied to the base of a transistor Q7 which drives a transistor Q6 whose collector-emitter path is connected in series with the motor 11 across the supply voltage.

It should be appreciated that the motor speed control circuit 12 is effectively a closed loop.

A transistor Q8 is included in the motor speed control circuit 12 to provide thermal compensation and acts to offset the thermal drift in the motor speed control circuit.

The supply rail 15 from which the motor speed control circuit and the transistor Q5 are energised through a switch S4a is connected to the main supply through the voltage regulator circuit 13 which comprises a transistor Q9 controlled by a zener diode ZD3. The voltage regulator includes a diode D8 for reverse polarity protection; a resistor R13 and a capacitor C20 form an input filter.

In order to switch to the clock 14, switches S4a and S4b which are mechanically ganged are opened, opening of switch S4a serving to de-energise the motor 11 and the light emitting diodes D6 and D7. Normally, one effect of closing of switch S4a is to apply a voltage to an inhibit gate IC3d as it should be appreciated that points X are connected together. In the event that this voltage is applied to inhibit gate IC3d, the output of gate IC3d applies an inhibiting voltage to the oscillator 14 which prevents oscillation. However, on removal of the voltage to the inhibit gate IC3d, its output rises so that oscillator constituted by gates IC3a and IC3b and associated components will then oscillate. The output of gate IC3b is differentiated by capacitor C22 and resistor R35 and is applied through gate IC3c and diode D9 to the monostable 2.

The oscillator 14 includes a switch S4c similar to the switch S2b to select one of three variable resistors, RV8, RV9 and RV10 to provide three ranges.

The repeater meter drive circuit is shown in FIG. 2 and is connected to the four connection terminals 16 illustrated in FIG. 1. These connection terminals 16 provide the output of the reed relay S1 or the oscillator 14, earth, a 9 volt supply, and the output of the comparator IC2. It will be appreciated that the reed relay or oscillator output constitutes the transmitted pulse and the output of the comparator IC2 constitutes the received pulse, these being referred to as the received pulse Tx and the received pulse Rx respectively.

The remote repeater meter includes a circuit for generating voltage proportional to the time between the transmitted pulse Tx and the received pulse Rx minus a deduction corresponding to the depth of the keel below the transducer as the user is often interested in the depth below the keel rather than the depth below the transducer. Referring to FIG. 2, the transmitted pulse Tx is differentiated by a differentiating circuit 17 and is used to trigger a monostable 18. The width of the output pulse of the monostable 18 is variable to correspond with the actual depth below the keel of the transducer and the negative output edge of the monostable 18 is used to trigger a monostable 19 having a 2 ms output pulse. The output of the monostable 19 is used to trigger a bistable 20.

The positive output of the monostable 18 is used to inhibit a gate 21 through which received pulses Rx are applied to re-set the bistable 20. The output of the bistable 20 is a pulse proportional to the time between a transmitted pulse and a received pulse minus a deduction for the depth between the transducer and the keel and is integrated and applied to the meter 22.

In more detail, the differentiating circuit 17 is constituted by a capacitor C35 and a resistor R50a and the monostable 18 includes gates IC7a and IC7b; the period of the monostable 18 is determined by a variable resistor VR14.

The bistable 20 includes gates IC6b and IC6d the gate IC6d receiving the output of the monostable 19. Gate IC6b receives the received pulses Rx through the gate 21 after differentiation by a differentiating circuit constituted by a capacitor C34 and a resistor R55.

The integrator is constituted by a capacitor C39 connected across the meter 22, the output of the bistable 22 being applied to the meter 22 with its integrator C39 through a drive transistor Q15.

If it is desired that the scale should be expandible a variable resistor VR16 is connected in series with the meter 22, the capacitor C39 being connected in parallel with meter 22 and variable resistor VR16 as is illustrated in FIG. 3.

FIG. 4 illustrates a modification of the repeater meter circuit which selects the last received pulse Rx received between two successive transmitting pulses Tx. This circuit has a ramp signal generator re-set by each transmitted pulse Tx; each received pulse Rx causes the instantaneous output of the ramp generator to be transferred to a capacitor, so that if after a received pulse has caused such a transfer a subsequent received pulse Rx occurs before the next transmitted pulse Tx, the charge on the capacitor is increased so that the charge on the capacitor will always rise to the output of the ramp generator at the time of the last received pulse Rx in each cycle.

In detail, a capacitor 30 receives current from a constant current generator 31; the constant current generator 31 is of conventional design and includes a transistor 32 arranged to receive at its base a constant voltage set by a Zener diode 33 and having a collector resistor 34 setting the value of its output current.

The voltage across the capacitor 30 is re-set to zero by each transmitted pulse Tx which is applied through a differentiator 35 and a single stage amplifier and inverter 36 to a transistor 37 connected across the capacitor 30.

Each received pulse Rx is amplified by a two stage amplifier 38 and is applied through a diode 39 to the base of a transistor 40 which is also connected through series diodes 41 and 42 to the junction between the capacitor 30 and the constant current generator 31. A capacitor 43 shunted by a resistor 44 is connected between the emitter of transistor 40 and earth, that emitter also being connected to the base of a transistor 45 connected as an emitter follower; the meter 22 is connected in series with a resistor 46 between the emitter of the transistor 45 and earth.

In the absence of an output signal from the amplifier 38, that is to say in the absence of a received pulse Rx, diode 39 conducts so that the base of the transistor 40 is cut off and no charge will be transferred to the capacitor 43. On each occasion when a received pulse Rx is received diode 39 ceases to conduct with the result that the potential of the base of the transistor 40 rises to that across the capacitor 30 and assuming that the capacitor 43 is not already charged to this level the capacitor 43 will charge up to the level of the capacitor 30.

The amplifier 38 is prevented from responding to a received pulse Rx occurring simultaneously with the transmitted pulse Tx by an inverter 47 connected between the output of the amplifier 36 and the input of the amplifier 38.

In the absence of any received pulses the capacitor 43 gradually discharges through the resistor 44 and also through the transistor 45, the resistor 46 and the meter 22.

An alternative to the motor speed control circuit 12 is shown in FIG. 5.

Referring to that drawing, a DC motor 50 is energised from the output of an integrator 51. A zero pick-up 52 produces an output pulse on each occasion the shaft of the motor passes a datum position and consists of a reed relay co-operating with a magnet carried by the motor or by the rotary arm. The output of the pick-up 52 is applied to a monostable 53 which produces an output pulse of fixed width and applies that output pulse to an inverter 54. The output of the inverter 54 is essentially a square wave whose mark-space ratio depends on the motor speed and decreases with an increase in motor speed. At the designed operating speed of the motor the output pulse of the monostable 53 has a width corresponding to approximately half a revolution of the motor.

An effect of increasing the mechanical loading on the motor 50 will be to slow the motor. However, this slowing of the motor speed increases the mark-space ratio of the output of the inverter, that is to say, the signal applied to the integrator 51 as the "off" time is constant whereas the "on" time will increase with a reduction in the motor speed. Consequently, the output voltage of the integrator 51 will increase and will tend to increase the motor speed offsetting the reduction in speed created by the mechanical load. This effect could occur in reverse if the loading on the motor 50 were to be reduced so that the circuit tends to stabilise the motor speed.

This circuit offers the advantage that it allows much lower speeds to be reliably achieved in comparison to the speed control circuit 12 shown in FIG. 1. Considering the circuit in FIG. 1 if this is used to drive the motor at a relatively low speed there is always the possibility that even if the motor can run at this speed, the combined effect of static friction and cold lubricant will not allow the motor to start. With the arrangement shown in FIG. 5 this problem is largely overcome since if the motor fails to rotate the output of the inverter 51 will be permanently at its most positive so that the integrator will integrate up to a maximum voltage at which one could expect the static friction to be overcome and the motor 50 to start to rotate. The motor would of course accelerate to a speed stabilized by the circuit shown in this Figure.

Because the motor speed can be relatively slow it can be arranged that a single revolution of the rotor arm of the echo sounder will correspond to a relatively large depth e.g. 120 fathoms.

What is claimed is:

1. An echo sounder comprising transducer means for transmitting and receiving pulses of energy; first and second display means for displaying received echo pulses in a manner indicative of the distance of the object giving rise to the echo; and a variable gain amplifier through which the transducer means is connected to the first and second display means; the first display means comprising a motor, a rotary member coupled to the motor, a light emitting device carried by the rotary member, a scale with which the rotary member co-operates, a first switch means co-operating with the rotary member and coupled to the transducer means, whereby said rotary member actuates said first switch means at a first frequency and a second switch means in series with the motor; and the second display means including an oscillator operating at said first frequency coupled to the transducer means and connected so as to be rendered operative when the second switch means is operated to de-energize the motor, whereby said variable gain amplifier is adjusted to a desired threshold during operation of said first display means and then said second switch is actuated to cause the display to appear only on said second display means.

2. An echo sounder as claimed in claim 1, which comprises a circuit for generating a voltage representative of the period between a transmitted pulse and a received pulse and a display for displaying the output of the circuit.

3. An echo sounder as claimed in claim 2, wherein the circuit comprises a bistable and an integrator for integrating the output of the bistable which is set by each transmitted pulse and reset by received pulses.

4. An echo sounder as claimed in claim 3 which comprises a variable width monostable which receives transmitted pulses, the trailing edge of each output pulse of the monostable being arranged to set the bistable, and a gate through which received pulses are applied to the reset input of the bistable, said gate being connected to the output of the monostable so as to pass received pulses other than during output pulses of the monostable.

5. An echo sounder as claimed in claim 2 wherein the circuit comprises a constant current generator, a capacitor connected to be charged by said constant current generator, a capacitor discharge circuit connected across the capacitor and rendered operative by each transmitted pulse, and a sample and hold circuit connected to the capacitor and arranged to be rendered operative by each received pulse.

6. An echo sounder as claimed in claim 1 which comprises a motor speed control circuit.

7. An echo sounder as claimed in claim 6 wherein the motor speed control circuit comprises a pick-up for co-operating with the motor to produce a train of pulses at a rate proportional to the motor speed, a pulse shaper connected to the output of the pick-up so as to produce an output pulse of constant width for each input pulse from the pick-up, and an integrator connected to the output of the pulse shaper and arranged to integrate a potential other than during the output pulses of the pulse shaper, the output of the integrator being connected as the supply voltage of the motor.

8. An echo sounder as claimed in claim 1, which includes a pulse width discrimination circuit through which the output of the transducer means is coupled to the first and second display means, said discrimination circuit being arranged to suppress pulses having a width less than a predetermined minimum.

9. An echo sounder as claimed in claim 1, wherein the econd display means comprises a meter.

10. An echo sounder as claimed in claim 1, wherein the second display means comprises a digital display.

* * * * *